United States Patent [19]

Ward

[11] Patent Number: 4,597,946
[45] Date of Patent: Jul. 1, 1986

[54] VERTICAL TUBE REACTOR WITH SERIAL DOWNWARD FLOW THROUGH A PLURALITY OF SETS OF PARTICULATE CONTAINING TUBES

[75] Inventor: Dennis J. Ward, South Barrington, Ill.

[73] Assignee: UOP Inc., Des Plaines, Ill.

[21] Appl. No.: 728,969

[22] Filed: Apr. 30, 1985

[51] Int. Cl.⁴ .................. B01J 8/04; B01J 8/06; B23K 31/02
[52] U.S. Cl. ...................... 422/190; 29/428; 228/183; 422/195; 422/197; 422/201
[58] Field of Search ............... 422/181, 188, 190, 191, 422/192, 193, 195, 196, 197, 216, 220, 236, 201, 312, 148, 189; 165/150, 172, 160, 176, 159, 174, DIG. 13; 423/360; 208/146; 260/700; 29/428; 228/183

[56] References Cited

U.S. PATENT DOCUMENTS

| | | | |
|---|---|---|---|
| 1,894,760 | 1/1933 | Dodd | 165/172 X |
| 2,049,748 | 8/1936 | Rathbun | 165/160 X |
| 2,468,903 | 5/1949 | Villiger | 165/160 X |
| 2,835,560 | 5/1958 | Bason et al. | 23/288 |
| 3,424,553 | 1/1969 | Preusser et al. | 23/199 |
| 3,477,828 | 11/1969 | Schulze et al. | 422/148 |
| 3,663,179 | 5/1972 | Mehta et al. | 422/148 |
| 4,225,562 | 9/1980 | Anderson | 422/188 |
| 4,308,234 | 12/1981 | Pastormerlo | 422/193 |
| 4,461,745 | 7/1984 | Ahlstrom, Jr. | 422/197 |

FOREIGN PATENT DOCUMENTS 2120119A 5/1983 United Kingdom .

Primary Examiner—Barry S. Richman
Assistant Examiner—R. Barney
Attorney, Agent, or Firm—Thomas K. McBride; William H. Page, II; Barry L. Clark

[57] ABSTRACT

Plural vertical tube reactor provides downward flow only, in a serial manner, through a plurality of sets of tubes containing a particulate contact material such as a catalyst which are located in adjacent sectors or reigons of a shell and tube reactor. An empty tube(s) is provided to carry the reactant fluid upwardly from the bottom of one sector of tubes to the top of another. In a two sector configuration, the upper and lower end chambers are each partitioned in half, but the lower partition has a screened port to allow reacted fluid from the first sector to reach, and move upwardly through, an empty tube(s) in the second sector which is isolated from the other tubes in the second sector at its bottom end but not at its top end.

4 Claims, 4 Drawing Figures

VERTICAL TUBE REACTOR WITH SERIAL DOWNWARD FLOW THROUGH A PLURALITY OF SETS OF PARTICULATE CONTAINING TUBES

BACKGROUND OF THE INVENTION

The invention relates to reactors, and particularly to reactors which contain a large number of vertical tubes which are adapted to be filled with a particulate material such as a catalyst through which a reactant fluid is passed. An example of such a reactor would be one in which an exothermic polymerization or oligomerization reaction takes place as a reactant fluid passes downwardly through the catalyst particles which are present in the plurality of tubes. For example, the reaction could be the conversion of an olefinic monomer into an olefinic dimer, trimer or tetramer. More specifically, the reaction could convert ethylene gas into butenes, hexenes or octenes. In a particular commercially available reactor which it is intended be modified, the upper and lower ends of the catalyst containing tubes are mounted in tube sheets which cooperate with the upper and lower ends of the reactor vessel to form an upper inlet chamber for receiving an incoming charge to be reacted with the catalyst and a lower outlet chamber for receiving the reaction product. The portion of the vessel which surrounds the tubes is filled with a heat exchange fluid. Typically, where the reaction is exothermic, the heat exchange fluid would be cooling water circulated at a rate sufficient to keep the catalyst in the tubes at a uniform desired temperature which is sufficiently high to promote good conversion but not so high as to significantly reduce the life of the catalyst or to produce undesired side reactions.

In the existing prior art vessels which are intended to be modified by the present invention, the fluid charge to be reacted with the catalyst is fed downwardly through all the tubes in the reactor, typically about 180 tubes, in a single pass. The restriction of flow to a downward direction avoids the possibility of catalyst attrition which could result if the catalyst were fluidized by upward flow through it. However, to achieve the contact residence time which is usually required between the reactant fluid charge and the catalyst in a vessel, the flow velocity of the fluid must be only about half as much in a single pass arrangement through a large number of tubes as it would be if it were possible to use a dual pass arrangement with flow through half as many tubes in each pass. Where several vessels are utilized in a single operation, it would be possible to increase the flow velocity by moving the fluid in series through the various vessels. For example, where the tubes of three vessels are connected in series, the reactant fluid, for a given contact time, could be moved at triple the velocity that would be possible if the tubes of the vessels were connected in parallel. Obviously, the increased velocity would increase the pressure drop through the tubes and there are some relatively fragile catalysts that could not tolerate a substantial velocity increase. However, where a catalyst can tolerate an increase in flow velocity and pressure drop, the increase in velocity can be extremely beneficial since it will cause the heat transfer coefficient to be increased quite substantially. Simultaneously, the mass transfer resistance between the bulk fluid and the catalyst will be reduced. Also, the catalyst life will be prolonged due to the elimination of "hot spots" which can develop at low velocities because of relatively poor heat transfer between the fluid and the catalyst. Another problem with the low velocity arrangements is that such a low pressure drop is present that very small variances in the quantity of catalyst present in the several tubes can result in nonuniform flow distribution. For example, if the head of catalyst is higher in one tube than another due to variations in packing, the tube with the greater head will present a greater resistance to flow and thus will see very little flow as compared to a tube with a lesser head of catalyst. Thus, some catalyst will be underutilized and other catalyst will be overutilized. The problem tends to be eliminated as overall pressure drop increases, since variations in pressure drop due to changes in catalyst head from tube to tube would become relatively insignificant compared to the overall pressure drop. For example, increasing the flow velocity by 400% results in an approximately 1600% increase in pressure drop.

Prior art patents which relate to reactors with multiple beds of contact material include U.S. Pat. Nos. 2,835,560, 3,424,553, 4,225,562, 4,308,234 and 4,461,745. U.K. Patent Application No. 2,120,119-A is also of interest in that it provides serial horizontal flow between a plurality of compartments with the addition of fresh gas between compartments. U.S. Pat. No. 4,461,745 shows a basic shell and tube reactor structure of the general construction which it is desired to modify. However, the disclosed design contemplates upward flow through the catalyst, a condition which could not be tolerated in the instant situation.

SUMMARY OF THE INVENTION

It is an object of the invention to provide an improved reactor apparatus which permits multiple fluid passes in a serial arrangement and in only a downward direction through a multiple number of sets of tubes, wherein each set comprises a plurality of tubes filled with catalyst or other particulate contact material.

It is a further object to provide an improved reactor apparatus which permits multiple fluid passes in a serial arrangement and in only a downward direction through a multiple number of sets of tubes containing contact material by a relatively simple and economical modification to existing reactors which were originally designed for downward flow in a single pass.

The foregoing and other objects and advantages are achieved by the reactor apparatus of the present invention which utilizes one or more partition members positioned in superposition with each other in the spaced inlet and outlet chambers of a shell and tube type reactor to divide each of the end chambers into two or more compartments. Each upper compartment is in communication with the lower compartment with which it is superposed by those tubes of a sector of the reactor which open into the respective superposed compartments. All of the tubes in the upper compartment which receive the reactant charge fluid and the vast majority of the tubes which have their upper ends in each additional upper compartment formed by a partition member are preferably filled to a predetermined level with particulate contact material, typically a catalyst. The charge fluid will successively pass downwardly through the catalyst filled tubes whose upper ends open into each of the adjacent upper compartments. To permit the charge fluid which has passed downwardly through the tubes in the first sector of the reactor to move to the top of the second sector, a small number of the tubes which depend downwardly from the compartment at the top of the second sector are not loaded with catalyst but are left empty. Also, the aforesaid tubes which are left empty are physically isolated within the lower compartment of the second sector from the filled tubes therein but are positioned so as to be in communication with the lower compartment of the first sector. Thus, the charge fluid which has reached the bottom compartment of the first sector after passing downwardly through the catalyst filled tubes in the first sector is forced to travel upwardly through the empty tubes and into the compartment at the top of the second sector from which it will pass downwardly through the catalyst filled tubes in the second sector. Depending upon how many partitions have been installed, the charge will either be directed out of the vessel from the lower compartment under the second sector or will pass upwardly in a similar manner into a third and possibly a fourth upper compartment. The number of compartments and sectors will be one greater than the number of partitions and will be selected based upon the increase in velocity and pressure drop desired to be achieved. Since the empty tubes contain no particles which would resist the upward flow of charge fluid, very few of them, typically 1-5, are required.

DETAILED DESCRIPTION OF THE PREFERRED EMBODIMENT

Figure 1:
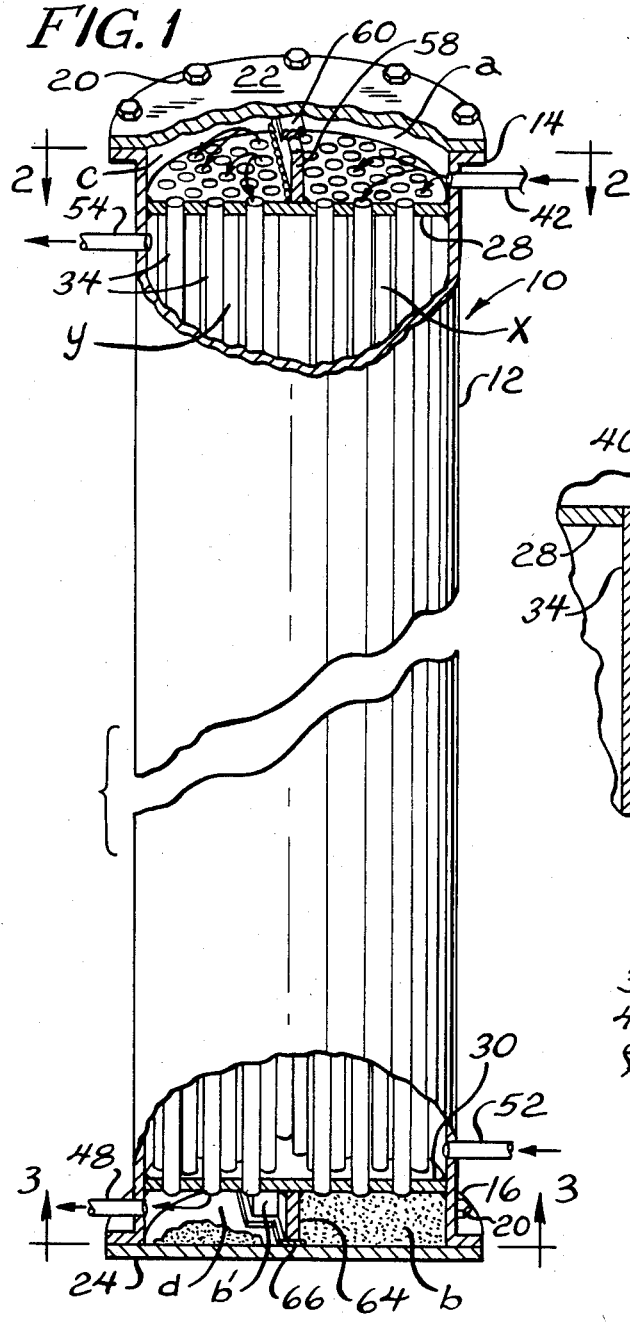
FIG. 1 is a perspective, partially sectioned and partially broken away view of a reactor incorporating the invention.
Figure 2:
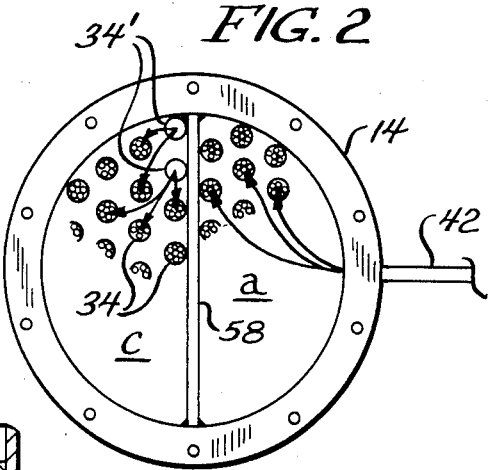
FIG. 2 is a sectional view taken on line 2—2 of FIG. 1.
Figure 4:
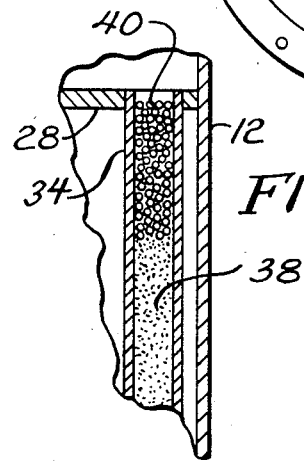
FIG. 4 is an enlarged, axial cross-section view showing one of the tubes of FIG. 1.

A preferred embodiment of the invention is illustrated in FIG. 1 and includes a vertical reactor vessel indicated generally at 10. The vessel has an outer cylindrical housing or shell 12 whose upper and lower ends comprise upper and lower flange portions 14, 16 respectively. The flanges 14, 16 are attached by fastening means such as bolts 20 to a flat upper end cover plate 22 and a flat lower end cover plate 24, respectively. A pair of upper and lower tube sheets 28, 30 are preferably welded to the inside wall of the shell 12 at locations which are spaced from the end cover plates 22, 24. The tube sheets are sealed to, and form the support for, a large multitude of tubes 34 in any conventional manner. The tubes 34, as can be seen in FIG. 4, are filled slightly short of their tops with small particles 38 of a catalyst, with the balance of the tube space above them being filled with larger and heavier plain ceramic balls 40 which serve to prevent the catalyst from being disturbed by any sudden inrush of charge fluid through inlet fitting 42, or by any upward fluid movements which might otherwise tend to fluidize the catalyst. In a conventional prior art single pass reactor, the entire enclosed space above the upper tube sheet 28 would be open to permit the fluid charge entering inlet 42 to flow downwardly into all of the tubes 34 and into the entire enclosed space under the lower tube sheet 30 from which it would then flow outwardly through outlet fitting 48. Since there would typically be an exothermic reaction occurring in the tubes the tubes are cooled by water or other cooling medium which is circulated through the shell. The cooling fluid enters lower fitting 52 and exits upper fitting 54. The amount of cooling provided is preferably sufficient to maintain the catalyst in the tubes at a uniform optimum operating temperature.

Figure 3:
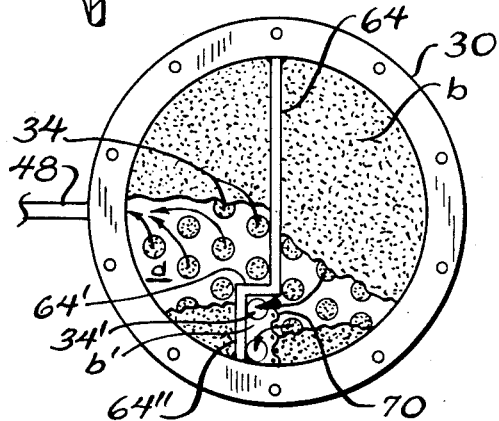
FIG. 3 is a sectional view taken on line 3—3 of FIG. 1.

The elements hereinbefore described relative to the reactor vessel 10 are those present on certain existing prior art vessels. To modify such vessels in accordance with the teachings of the present invention, certain additional elements are required. One or more vertical divider or partition plates 58 are welded or otherwise attached to the upper tube sheet 28 and sealed relative to the cover plate 22 by a strip of gasket material 60. The single divider plate 58 shown divides the space above the tube sheet 28 into a pair of isolated compartments a, c. The compartment a is the inlet compartment which receives the charge fluid entering inlet 42. The inlet compartment a communicates with a bottom compartment b with which it is vertically aligned, through the tubes 34 that join the compartments. The bottom compartment b is formed similarly to the compartment a by a vertical divider plate 64 which is welded or otherwise fastened to lower tube sheet 52 and which is sealed relative to bottom cover plate 24 by a gasket strip 66. As best seen in FIG. 3, the lower partition 64 has short portions 64', 64" at one end which define a small compartment b' which is an extension of compartment b except that it is isolated from the catalyst 38 in compartment b by a screen element 70 which defines a flow port from compartment b to a compartment b'. It can be seen that extension compartment b' is in open communication with a pair of empty tubes 34' that do not contain any catalyst 38 or balls 40. Since the tubes 34' are empty, the fluid which enters compartment b' can move upwardly through them very rapidly. The upper ends of the empty tubes 34' are the inlet source of the fluid which enters the upper compartment c and gets distributed into the upper ends of those filled tubes which depend from compartment c. After the fluid passes downwardly through the tubes 34 which depend from the compartment c it enters lower compartment d and then exits the vessel through outlet 48. The portions of the reactor intermediate the tube sheets 28,30 can conveniently be considered as being arranged in sectors x, y which have the same radial and circumferential extent as the upper compartments a, c, respectively, which overlie them and which are defined by the partition or divider member 58.

As can be seen from the drawings and accompanying description, the fluid which passes through the tubes in sector x as it travels from compartment a to compartment b will travel at about twice the velocity, for a given amount of catalyst contact time, that it would achieve if it made only a single downward pass. The higher velocity increases the efficiency of contact with the catalyst while the resultant mixing in compartment b, and in the empty tubes 34', of the fluids from each of the tubes 34 in sector x, will provide a more uniform charge to compartment c, and thus to the catalyst containing tubes 34 of sector y.

I claim as my invention:

1. In a reaction vessel having particulate contact material contained in a large plurality of vertical tubes positioned therein, and means permitting ingress of fluid to the upper ends of said contact material containing tubes for the downward flow of a fluid therethrough, said plurality of tubes being located parallel to each other within said vessel and having their ends mounted in upper and lower tube sheets which are mounted adjacent the ends of said vessel and sealed thereto so as to define upper and lower chambers positioned respectively above and below said upper and lower tube sheets through which fluid may flow, the improvement comprising at least one upper vertical partition member mounted in said upper chamber and at least one vertical partition member mounted in said lower chamber, at least one of said at least one vertical partition members in said upper chamber being in at least general vertical alignment with said at least one vertical partition in said lower chamber and dividing each of said chambers into isolated compartments which each contain the open ends of a plurality of tubes; said at least one vertical partition in said lower chamber including a flow port and an extension portion from a first compartment which extends into an adjacent compartment where it surrounds and communicates with the open end of at least one additional tube in said adjacent compartment but is sealed relative to the remainder of the tubes in said adjacent compartment; said at least one additional tube being open and substantially devoid of particulate contact material, thereby permitting fluid passing downwardly under pressure through the contact material containing tubes whose open lower ends are in said first compartment to be forced upwardly through said at least one additional tube, and into the upper chamber in a compartment portion thereof which vertically overlies said at least one additional tube and said adjacent compartment in said lower chamber, from where it can pass downwardly through the plurality of contact material containing tubes whose open lower ends terminate in said adjacent compartment.

2. The reaction vessel of claim 1 wherein the improvement further comprises each of said at least one vertical partition members which are mounted in each of said upper and lower chambers being welded to its respective tube sheet.

3. The reaction vessel of claim 2 wherein the improvement further comprises said flow port in said at least one vertical partition in said lower compartment being covered by a screen element which has openings therein which are insufficiently large enough to permit the passage of particulate contact material therethrough.

4. A method of increasing the velocity of flow of a reactant fluid in a downward direction in a vessel containing upper and lower tube sheets and through a plurality of tubes sealed in said tube sheets which contain particulate contact material and whose upper and lower ends all terminate in common upper and lower chambers located respectively above and below said upper and lower tube sheets, said method comprising the steps of attaching at least one vertical partition member to said upper and lower tube sheets so as to partition each of the upper and lower chambers into at least first and second adjacent compartments which are at least generally superposed in vertical alignment and joined by a plurality of the particulate material containing tubes mounted in said tube sheets; forming a screened port in said at least one vertical partition in the lower chamber and extending the walls of said at least one lower vertical partition into said second adjacent compartment in said lower chamber so as to surround at least one additional tube therein and isolate its lower end from the remainder of the tubes in said second compartment, said at least one additional tube being devoid of particulate material and serving as a conduit to carry fluid which has passed through a plurality of particulate filled tubes from the first upper compartment to the first lower compartment, to the upper ends of the particulate filled tubes which are in the second compartment.

* * * * *